United States Patent
Lucas et al.

(10) Patent No.: US 10,232,205 B2
(45) Date of Patent: Mar. 19, 2019

(54) MULTI-DIRECTIONAL FIRE EXTINGUISHING NOZZLE

(71) Applicant: UNITED TECHNOLOGIES CORPORATION, Farmington, CT (US)

(72) Inventors: James L. Lucas, Hamden, CT (US); Steven C. Lee, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 116 days.

(21) Appl. No.: 15/288,613

(22) Filed: Oct. 7, 2016

(65) Prior Publication Data

US 2018/0099169 A1    Apr. 12, 2018

(51) Int. Cl.
A62C 3/08 (2006.01)
F02C 7/25 (2006.01)
A62C 31/05 (2006.01)
A62C 35/68 (2006.01)

(52) U.S. Cl.
CPC .......... *A62C 3/08* (2013.01); *A62C 31/05* (2013.01); *A62C 35/68* (2013.01); *F02C 7/25* (2013.01)

(58) Field of Classification Search
CPC .......... A62C 3/08; A62C 31/02; A62C 31/05; A62C 35/68; B05B 1/14; F01D 25/24; F02C 7/25
USPC ...................................... 169/37, 62
See application file for complete search history.

(56) References Cited

U.S. PATENT DOCUMENTS

| 4,989,675 A * | 2/1991 | Papavergos | A62C 31/02 169/14 |
| 7,726,409 B2 * | 6/2010 | Haaland | A62C 3/06 169/11 |
| 2012/0255746 A1 | 10/2012 | Johnsen | |
| 2016/0059057 A1 | 3/2016 | Disimile | |

FOREIGN PATENT DOCUMENTS

| GB | 520714 | 5/1940 |
| WO | 9425112 | 11/1994 |

OTHER PUBLICATIONS

European Patent Office, European Search Report dated Feb. 6, 2018 in Application No. 17193392.2-1113.

* cited by examiner

Primary Examiner — Darren W Gorman
(74) Attorney, Agent, or Firm — Snell & Wilmer, L.L.P.

(57) ABSTRACT

A multi-directional fire extinguishing nozzle is disclosed. The multi-directional fire extinguishing nozzle may comprise a pylon fitting configured to receive a fire extinguishing agent. The multi-directional fire extinguishing nozzle may comprise a hose fitting coupled to the pylon fitting via a coupling nut. The multi-directional fire extinguishing nozzle may comprise a plurality of fluid distribution outlets configured to deliver the fire extinguishing agent. The fluid distribution outlets may define voids on the surface of the coupling nut, and extending through the coupling nut and the hose fitting.

14 Claims, 6 Drawing Sheets

MULTI-DIRECTIONAL FIRE EXTINGUISHING NOZZLE

FIELD

The present disclosure relates to gas turbine engines, and more specifically, to a multi-directional fire extinguishing nozzle for nacelles of gas turbine engines.

BACKGROUND

Modern aircraft may utilize one or more turbofan propulsion systems powered by a gas turbine engine. The propulsion system may conventionally include a nacelle surrounding an engine core within a core compartment and configured to help form aerodynamic surfaces for flight, including a fan bypass air duct. The core compartment may include the gas turbine engine power and accessory sections such as the compressor, combustor, and turbine sections of the gas turbine engine. The core compartment may be classified as a "Designated Fire Zone" as it contains ignition sources and the potential for flammable fluid leakage. Often, the nacelle includes a fire extinguishing system positioned on a lower surface of the pylon structure disposed towards the engine and configured to release fire extinguishing agent in response to a fire. Delivery of adequate amounts of fire extinguishing agent may be important to the fire extinguishing system. Typically, fire extinguishing systems comprise a plurality of single stream delivery nozzles configured to discharge fire extinguishing agent from a single orifice in a single direction.

SUMMARY

In various embodiments, a multi-directional fire extinguishing nozzle is disclosed. The multi-directional fire extinguishing nozzle may comprise a pylon fitting having a first inlet and a first outlet. The multi-directional fire extinguishing nozzle may comprise a hose fitting having a first end and a nozzle end. The first end may be coupled to the first outlet of the pylon fitting by a coupling nut. The multi-directional fire extinguishing nozzle may comprise a plurality of fluid distribution outlets defining a void on an outer surface of the coupling nut and extending into the hose fitting.

In various embodiments, the fluid distribution outlets may be oriented at an angle of about 5° to about 90° relative to an outer surface of the pylon fitting. In various embodiments, the multi-directional fire extinguishing nozzle may further comprise a plug coupled to the nozzle end of the hose fitting. The plug may comprise a plug distribution outlet defining a void on an outer surface of the plug. In various embodiments, an outer surface of the hose fitting and an inner surface of the coupling nut may define an annulus. The annulus may be in fluid communication with the fluid distribution outlets. The multi-directional fire extinguishing nozzle may also comprise a plurality of inner outlets defining a void on the outer surface of the hose fitting. The inner outlets may be in fluid communication with the annulus. In various embodiments, the multi-directional fire extinguishing nozzle may be configured to deliver a fire extinguishing agent.

In various embodiments, a nacelle for a gas turbine engine is disclosed. The nacelle may comprise a pylon structure configured to couple the nacelle to an aircraft. The nacelle may comprise a core compartment enclosing an engine core of the gas turbine engine. The nacelle may comprise a multi-directional fire extinguishing nozzle coupled to a lower surface of the pylon structure and disposed in a radial direction towards the core compartment. The multi-directional fire extinguishing nozzle may comprise a pylon fitting having a first inlet and a first outlet. The multi-directional fire extinguishing nozzle may comprise a hose fitting having a first end and a nozzle end. The first end may be coupled to the first outlet of the pylon fitting by a coupling nut. The multi-directional fire extinguishing nozzle may comprise a plurality of fluid distribution outlets defining a void on an outer surface of the coupling nut and extending into the hose fitting.

In various embodiments, the fluid distribution outlets may be oriented at an angle of about 5° to about 90° relative to an outer surface of the pylon fitting. In various embodiments, the nacelle may further comprise a plug coupled to the nozzle end of the hose fitting. The plug may comprise a plug distribution outlet defining a void on an outer surface of the plug. In various embodiments, an outer surface of the hose fitting and an inner surface of the coupling nut may define an annulus. The annulus may be in fluid communication with the fluid distribution outlets. The multi-directional fire extinguishing nozzle may also comprise a plurality of inner outlets defining a void on the outer surface of the hose fitting. The inner outlets may be in fluid communication with the annulus. In various embodiments, the multi-directional fire extinguishing nozzle is configured to deliver a fire extinguishing agent.

In various embodiments, a multi-directional fire extinguishing nozzle is disclosed. The multi-directional fire extinguishing nozzle may comprise a pylon fitting having a first inlet and a first outlet. The multi-directional fire extinguishing nozzle may comprise a plurality of fluid distribution outlets defining a void on an outer surface of the pylon fitting.

In various embodiments, the multi-directional fire extinguishing nozzle may comprise a plug coupled to the first outlet. The plug may comprise a plug distribution outlet defining a void on an outer surface of the plug. In various embodiments, the fluid distribution outlets may comprise a circular shape. In various embodiments, the fluid distribution outlets may be oriented at an angle of about 5° to about 90° relative to an outer surface of the pylon fitting. In various embodiments, the multi-directional fire extinguishing nozzle may be configured to deliver a fire extinguishing agent.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

Figure 1:
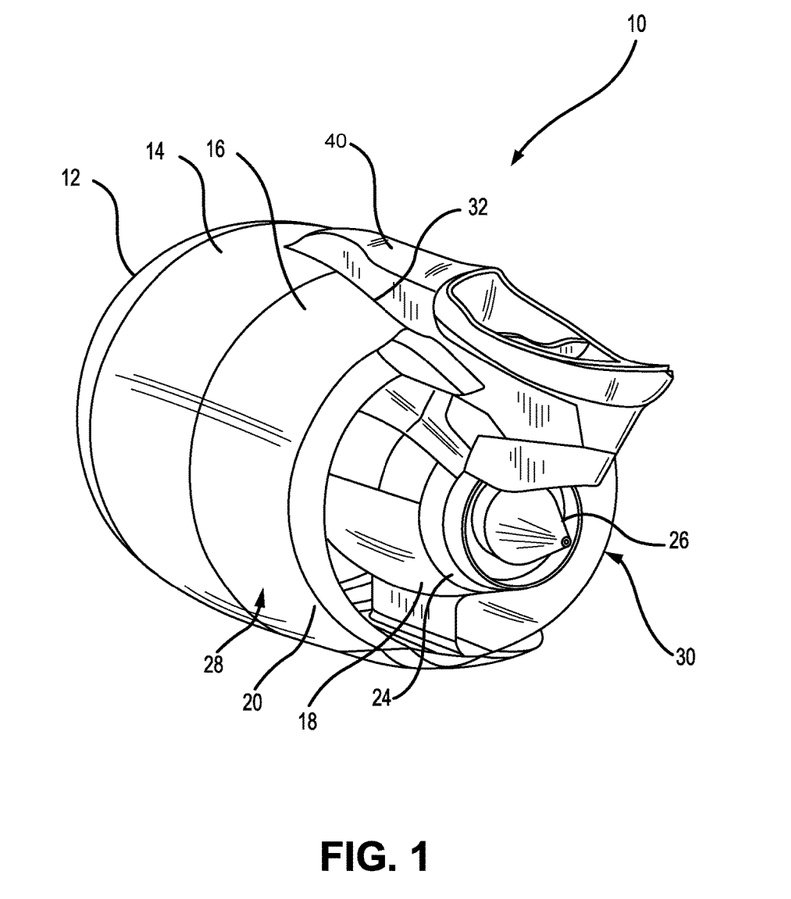
FIG. 1 illustrates a perspective view of a nacelle for an aircraft, in accordance with various embodiments.

Referring to FIG. 1, a nacelle 10 for a gas turbine engine is illustrated according to various embodiments. Nacelle 10 may comprise an inlet 12, a fan cowl 14, and a thrust reverser 16. Nacelle 10 may be coupled to a pylon 40, which may mount the nacelle 10 to an aircraft wing or aircraft body. Thrust reverser 16 may comprise an inner fixed structure ("IFS") 18 and an outer fixed structure ("OFS") 20. Bypass air from an engine fan may flow in a generally annular bypass air duct defined between the IFS 18 and the OFS 20. The IFS 18 may be formed together with or be coupled to, at its aft end, a core cowl 24, which in turn is adjacent to an exhaust nozzle 26 through which flows core engine exhaust air. The thrust reverser 16 may further be split into a left half 28 and a right half 30, such that there is, for example, a left half and a right half of IFS 18. The left half 28 and the right half 30 may be hinged to the pylon 40 at hinges 32. The left half 28 and the right half 30 may hinge open at hinges 32 in order to provide access to the engine for inspection or servicing. The left and right halves of the IFS 18 may together help form a core compartment around the engine when the left and right halves 28, 30 of the thrust reverser are closed.

Figure 2A:
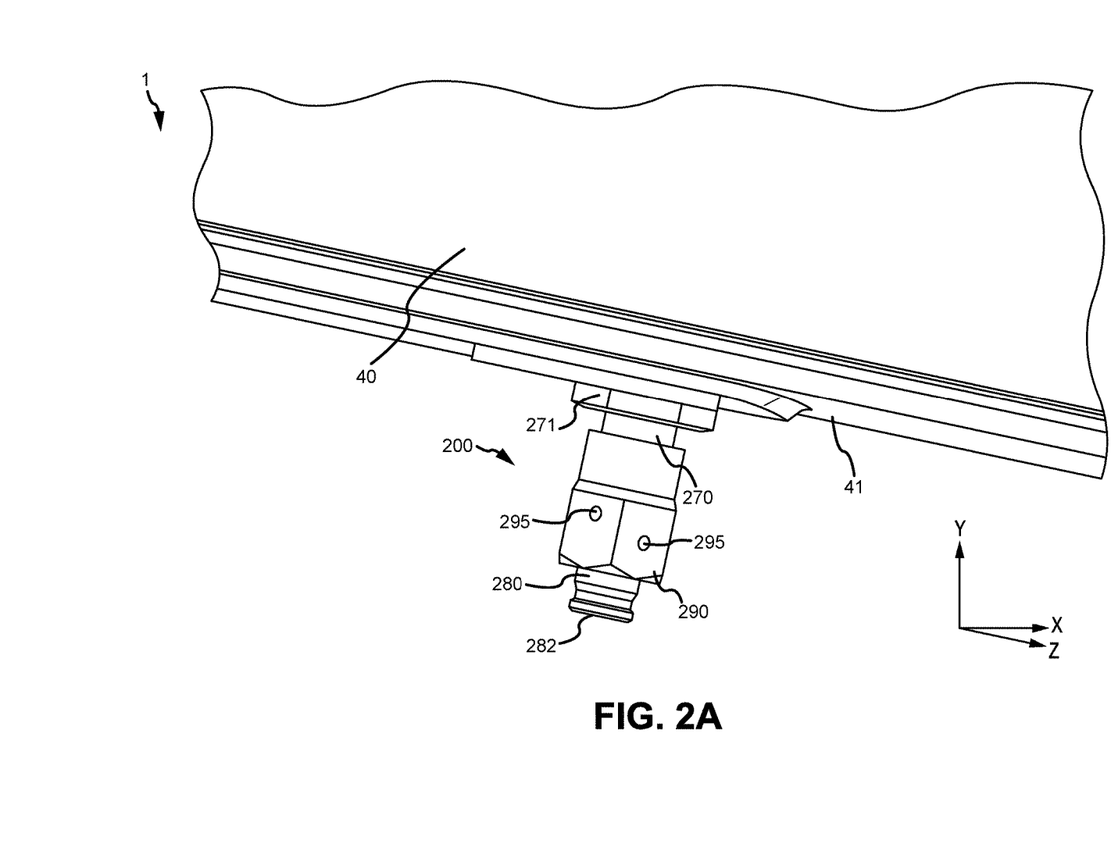
FIG. 2A illustrates a cross-sectional view of a fire extinguishing system, in accordance with various embodiments.

In various embodiments, and with reference to FIGS. 1 and 2A, a fire extinguishing system 1 is disclosed. Fire extinguishing system 1 may comprise at least one multi-directional nozzle 200. Each multi-directional nozzle 200 may be coupled to a lower surface 41 of pylon 40, and be disposed in a direction along the y-axis away from pylon 40, toward the core compartment around the engine. Multi-directional nozzle 200 may be configured to deliver a fire extinguishing agent (e.g., an inert gas and/or chemical agent used to extinguish fire such as, for example, HALON®) in a plurality of directional flows, in response to a fire being detected in the core compartment. Delivering the fire extinguishing agent in the plurality of directional flows may allow multi-directional nozzle 200 to deliver the fire extinguishing agent to a greater area of the core compartment compared to a single orifice nozzle. In that regard, fire extinguishing system 1 may utilize fewer fire extinguishing nozzles than typical fire extinguishing systems, as each multi-directional nozzle 200 may deliver the fire extinguishing agent to a greater area (when compared to a single orifice nozzle).

Figure 2B:
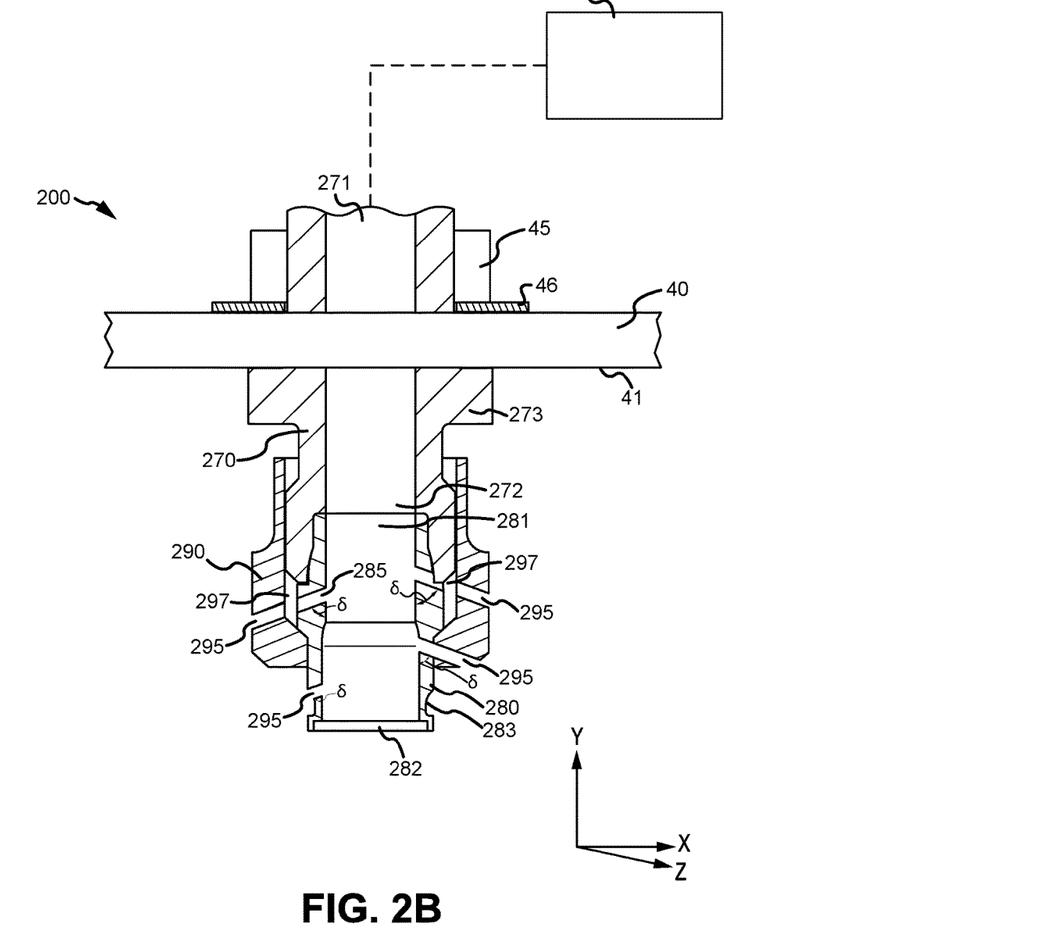
FIG. 2B illustrates a cross-sectional view of a multi-directional nozzle, in accordance with various embodiments.

In various embodiments, and with reference to FIGS. 2A and 2B, multi-directional nozzle 200 may comprise a pylon fitting 270, a hose fitting 280, and a coupling nut 290. Pylon fitting 270 may be configured to couple multi-directional nozzle 200 to pylon 40. Pylon fitting 270 may couple to an lower surface 41 of pylon 40 using any suitable method, such as, for example, through the use of a nut 45 and a washer 46. Pylon fitting 270 may comprise a hex 273 configured to position pylon fitting 270 against lower surface 41 of pylon 40. In that respect, hex 273 may position pylon fitting 270 against lower surface 41 of pylon 40, and nut 45 and washer 46 may couple pylon fitting 270 to pylon 40. Pylon fitting 270 may comprise a cylindrical tube, and/or the like, having a hollow center to allow for the flow of fluid and/or the like through pylon fitting 270. Pylon fitting 270 may comprise any suitable material, such as, for example, a nickel alloy, a nickel chromium alloy, and/or the like.

In various embodiments, pylon fitting 270 may also be configured to receive the fire extinguishing agent. In that regard, pylon fitting 270 may comprise a first inlet 271 opposite a first outlet 272. First inlet 271 may be configured to receive the fire extinguishing agent from pylon 40. In that regard, pylon 40 may comprise a fire extinguishing agent source 5 (e.g., as depicted in FIG. 2B), such as a tank, bottle, reservoir, and/or the like, configured to store and discharge fire extinguishing agent. Fire extinguishing agent source 5 may store the fire extinguishing agent in a pressurized environment, and may be configured to enable flow of the fire extinguishing agent in response to an engine fire (e.g., as determined and/or alerted by sensors, users, and/or the like). First inlet 271 may interface with a portion of pylon 40 in fluid communication with fire extinguishing agent source 5, allowing for the flow of fire extinguishing agent from pylon 40 into pylon fitting 270.

In various embodiments, hose fitting 280 may be configured to interface with pylon fitting 270 to provide an outlet for the first extinguishing agent. Hose fitting 280 may comprise a cylindrical tube, and/or the like, comprising a hollow center to allow for the flow of fluid through hose hitting 280. Hose fitting 280 may comprise any suitable material, such as, for example, a nickel alloy, a nickel chromium alloy, and/or the like. Hose fitting 280 may comprise a first end 281 opposite a nozzle end 282. First end 281 may be configured to interface with and fluidly couple to first outlet 272 of pylon fitting 270. First end 281 may be configured to receive the fire extinguishing agent from first outlet 272 of pylon fitting 270. In that respect, first end 281 of hose fitting 280 may substantially align with first outlet 272 of pylon fitting 270 such that fluid and/or the like may flow from pylon 40, via fire extinguishing agent source 5, through pylon fitting 270 and into hose fitting 280.

In various embodiments, hose fitting 280 may couple to pylon fitting 270 via any suitable coupling mechanism, such as, for example, coupling nut 290. Coupling nut 290 may enable pylon fitting 270 to removably couple to hose fitting 280. As discussed further below, a removable coupling of hose fitting 280 to pylon fitting 270, via coupling nut 290, may enable various hose fittings 280 and coupling nuts 290 having varying fluid distribution outlets 295 to be coupled to pylon fitting 270 (e.g., as selected based on operational requirements, gas turbine engine size, and/or the like). In that regard, hose fittings 280 and coupling nuts 290 comprising different configurations and/or patterns of fluid distribution outlets 295 may be switched based on operational requirements, gas turbine engine size, and/or the like.

In various embodiments, pylon fitting 270, hose fitting 280, and coupling nut 290 may define an annulus 297. Annulus 297 may define a void between an inner surface of coupling nut 290 and an outer surface of hose fitting 280. Annulus 297 may be in fluid communication with inner outlets 285 and fluid distribution outlets 295. In that respect, and as discussed further below, annulus 297 may be configured to receive fluid (e.g., the fire extinguishing agent) from an inner outlet 285 and distribute the fluid into fluid distribution outlets 295.

In various embodiments, multi-directional nozzle 200 may comprise a plurality of fluid distribution outlets 295 configured to deliver the fire extinguishing agent from multi-directional nozzle 200. Fluid distribution outlets 295 may define a void on an outer surface of multi-directional nozzle 200. For example, and in various embodiments, fluid distribution outlets 295 may define a void on an outer surface of coupling nut 290, the void extending through coupling nut 290 and into hose fitting 280. In that respect, fluid (e.g., the fire extinguishing agent) may flow through pylon fitting 270, hose fitting 280, annulus 297, and coupling nut 290, and exit through fluid distribution outlets 295. As a further example, and in various embodiments, fluid distribution outlets 295 may also define a void on an outer surface of hose fitting 280, the void extending through hose fitting 280 and enabling fluid to flow through pylon fitting 270 and hose fitting 280 and exit through fluid distribution outlets 295. In various embodiments, fluid pressure from fire extinguishing agent source 5 may be increased such that the fire extinguishing agent may be delivered through fluid distribution outlets 295.

Figure 4:
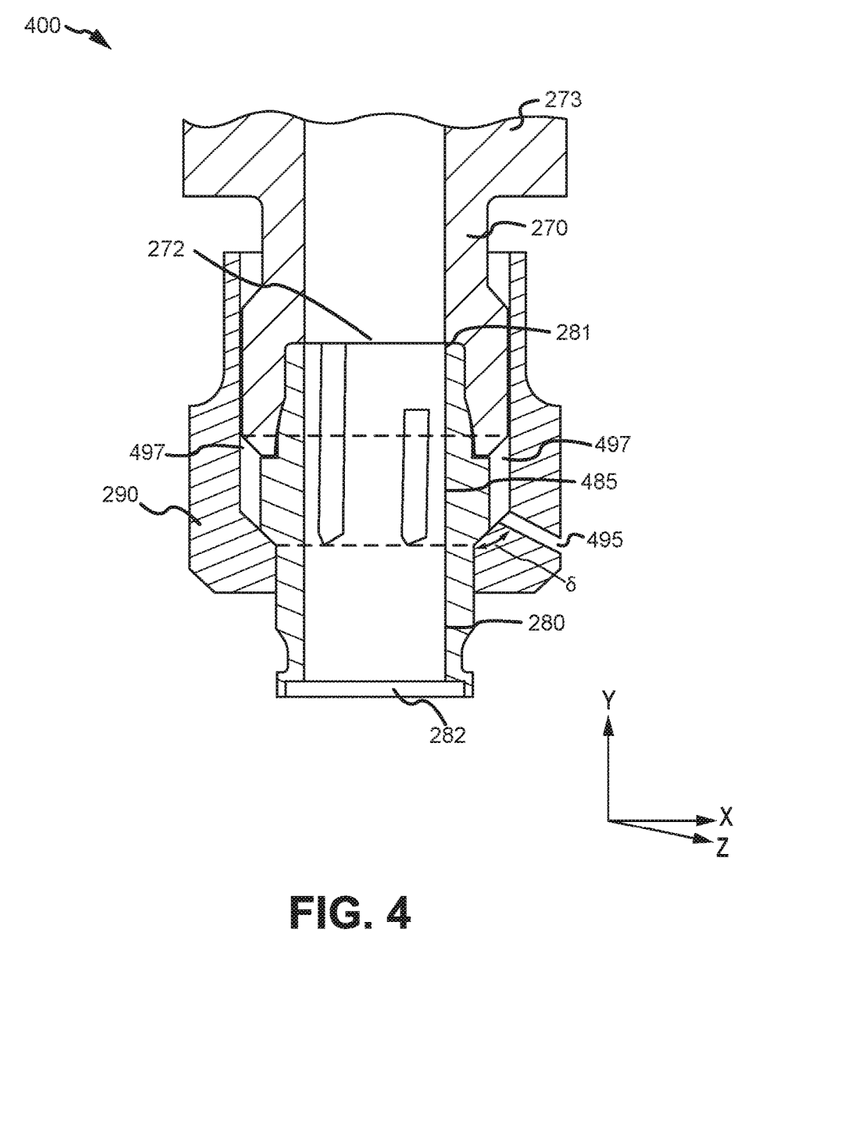
FIG. 4 illustrates a cross-sectional view of a multi-directional nozzle having high aspect ratio inner outlets, in accordance with various embodiments.

In various embodiments, hose fitting 280 may comprise an inner outlet 285 configured to deliver fluid (e.g., the fire extinguishing agent) from hose fitting 280 into annulus 297. Inner outlet 285 may define a void on an outer surface 283 of hose fitting 280 extending through an inner surface of hose fitting 280. Inner outlet 285 and annulus 297 may allow for fluid distribution outlets 295 that are non-collinear with inner outlets 285 to receive fluid from hose fitting 280. For example, hose fittings 280 and coupling nuts 290 comprising different configurations and/or patterns of fluid distribution outlets 295 may be switched based on operational requirements, gas turbine engine size, and/or the like. As such, and in various embodiments, fluid distribution outlets 295 may be non-collinear with inner outlets 285. In that respect, fluid distribution outlets 295 may receive fluid (e.g., the fire extinguishing agent) from hose fitting 280 via inner outlet 285 and annulus 297, to enable distribution of fluid from fluid distribution outlets 295. In various embodiments, inner outlet 285 may comprise any suitable shape and/or size capable of delivering fluid into annulus 297. For example, in various embodiments, and with reference to FIG. 4, multi-directional nozzle 400 may comprise an inner outlet 485 having a high aspect ratio. In that respect, the high aspect ratio may enable a greater flow of fluid from inner outlets 485 into annulus 497 (depicted with dashed lines), when compared to inner outlets 485 having a low aspect ratio, such as a circular or oval shape of similar width (e.g., as depicted in FIG. 2B). The greater flow of fluid into annulus 497 may enable a greater fluid pressure in annulus 497, allowing for pressurized delivery of fluid out of fluid distribution outlets 495.

In various embodiments, and with reference again to FIGS. 2A and 2B, hose fittings 280 and coupling nuts 290 may be retrofit to comprise fluid distribution outlets 295. In that respect, fluid distribution outlets 295 and/or inner outlets 285 may be formed by drilling, machining, electronic discharge manufacturing (EDM), and/or the like. In various embodiments, hose fitting 280 and coupling nut 290 may also be manufactured to comprise fluid distribution outlets 295 and/or inner outlets 285, such as, for example, via casting, forging, and/or the like.

In various embodiments, fluid distribution outlets 295 may comprise any suitable size and shape. In that regard, fluid distribution outlets 295 may comprise any suitable size and/or shape capable of increasing the surface area of multi-directional nozzle 200 that delivers the fire extinguishing agent when compared to a single orifice nozzle. For example, fluid distribution outlets 295 may comprise a circular, oval, rectangular, and/or any other suitable shape capable of delivering the fire extinguishing agent. Fluid distribution outlets 295 may also comprise any suitable size, dependent on the amount of fire extinguishing agent desired to be delivered. For example, larger gas turbine engines may require a greater amount of fire extinguishing agent compared to smaller gas turbine engines.

Figure 5:
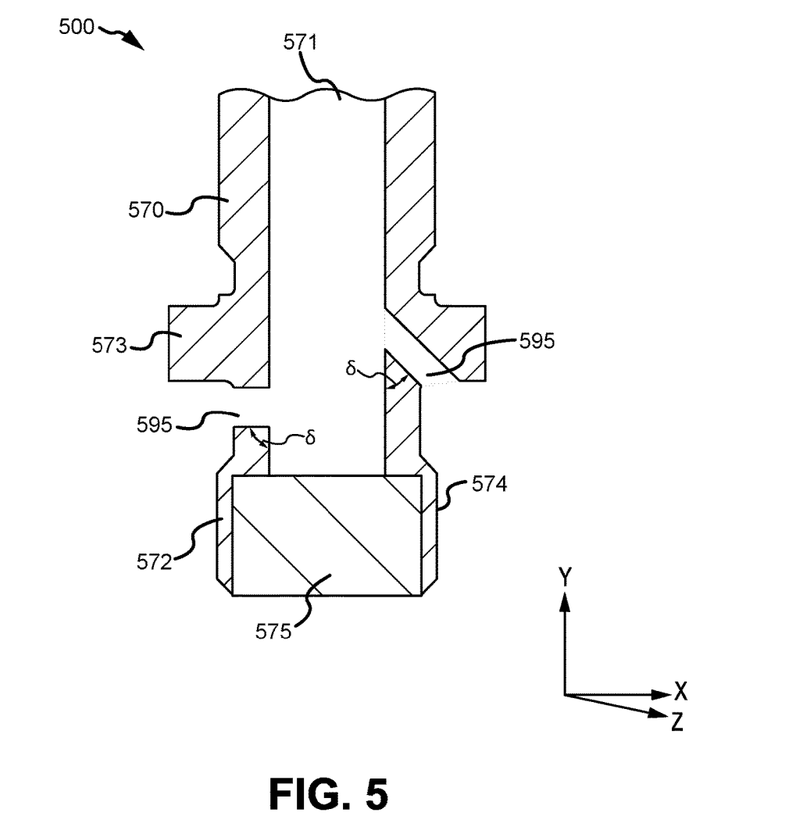
FIG. 5 illustrates a cross-sectional view of a multi-directional nozzle, in accordance with various embodiments.

In various embodiments, fluid distribution outlets 295 may be oriented along the x-axis and z-axis away from an outer surface 283 of hose fitting 280. In various embodiments, fluid distribution outlets 295 may be oriented at a directional flow angle delta ("δ") relative to outer surface 283 of hose fitting 280. For example, directional flow angle δ may be 0° to about 5°, about 5° to about 15°, about 15° to about 30°, about 30° to about 60°, or about 60° to about 90° (wherein about in this context refers only to +/−2°). In various embodiments, each fluid distribution outlet 295 may comprise a different directional flow angle δ (e.g., as depicted in FIG. 5).

Figure 3A:
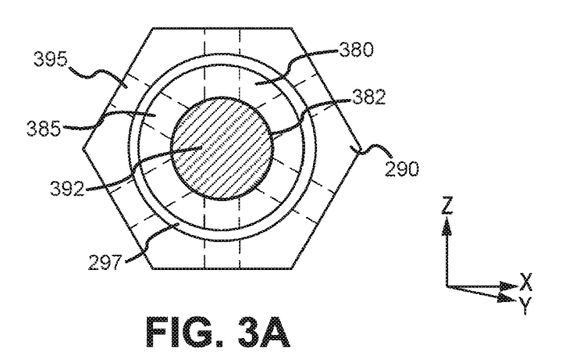
FIG. 3A illustrates a cross-sectional view of a multi-directional nozzle having a plug, in accordance with various embodiments.

In various embodiments, and with reference to FIG. 3A, nozzle end 382 of hose fitting 380 may comprise a plug 392. Plug 392 may be inserted within nozzle end 382 to at least partially prevent the fire extinguishing agent from being delivered through nozzle end 382. Plug 392 may comprise any suitable material, shape, and/or size capable of at least partially preventing delivery of the fire extinguishing agent through nozzle end 382. Plug 392 may allow a single orifice nozzle (e.g., a single orifice nozzle) to be retrofit for use as a multi-directional nozzle 200. In various embodiments, plug 392 may also enable a fluid pressure to build in hose fitting 380, allowing delivery of the fire extinguishing agent through fluid distribution outlets 395, and/or inner outlets 385. In that respect, the fluid pressure in fire extinguishing agent source 5 (with brief reference to FIG. 2B) may not require an increase in fluid pressurization to allow for delivery of fluid through fluid distribution outlets 395, and/or inner outlets 385.

Figure 3B:
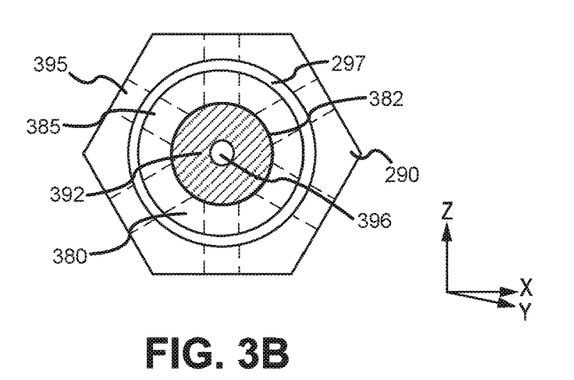
FIG. 3B illustrates a cross-sectional view of a multi-directional nozzle have a plug comprising a plug distribution outlet, in accordance with various embodiments.

In various embodiments, and with reference to FIG. 3B, plug 392 also be configured to selectively deliver the fire extinguishing agent. In that regard, plug 392 may comprise a plug distribution outlet 396. Plug distribution outlet 396 may define a void on plug 392, allowing for the delivery of the fire extinguishing agent through plug 392. Plug distribution outlet 396 may be formed through drilling, machining, EDM, and/or the like, or plug 392 may also be manufactured to comprise plug distribution outlet 396. Plug distribution outlet 396 may comprise any suitable and/or desired shape and size capable of allowing delivery of the fire extinguishing agent. In various embodiments, plug distribution outlet 396 may also comprise a size and shape allowing for a fluid pressure to maintain in multi-directional nozzle 300 to still enable delivery of the fire extinguishing agent through fluid distribution outlets 395, and/or inner outlets 385.

Figure 3C:
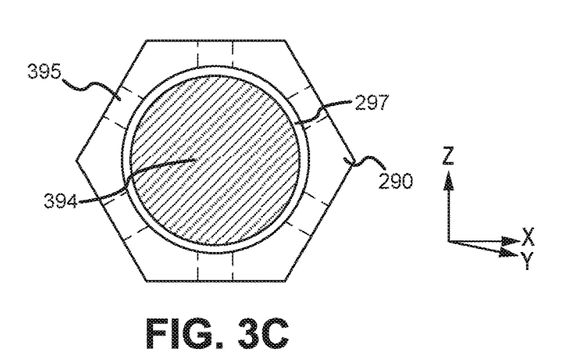
FIG. 3C illustrates a cross-sectional view of a multi-directional nozzle having a nozzle comprising a solid radially outer surface, in accordance with various embodiments.

In various embodiments, and with reference to FIG. 3C, nozzle end 382 of hose fitting 380 may also comprise a solid radially outer surface 394 configured to at least partially prevent a flow of fire extinguishing agent. For example, nozzle end 382 may be manufactured to comprise the solid radially outer surface 394. In that regard, nozzle end 382 may at least partially prevent the flow of fire extinguishing agent without the use of a plug (e.g., plug 392, with brief reference to FIG. 3A).

In various embodiments, and with reference to FIG. 5, multi-directional nozzle 500 may be configured to comprise only a pylon fitting 570 (e.g., multi-directional nozzle 500 does not comprise a hose fitting and/or a coupling nut). In that respect, multi-directional nozzle 500 comprising only a pylon fitting 570 may enable weight and/or cost savings for fire extinguishing systems. In various embodiments, pylon fitting 570 may comprise a plurality of fluid distribution outlets 595. Fluid distribution outlets 595 may define a void on an outer surface of pylon fitting 570, and may be configured to allow fluid to flow into pylon fitting 570 (e.g., from a fire extinguishing agent source) and exit through fluid distribution outlets 595.

In various embodiments, fluid distribution outlets 595 may be oriented along the x-axis and z-axis away from an outer surface 574 of pylon fitting 570. In various embodiments, fluid distribution outlets 595 may be oriented at a directional flow angle delta ("δ") relative to outer surface 574 of pylon fitting 570. For example, directional flow angle δ may be 0° to about 5°, about 5° to about 15°, about 15° to about 30°, about 30° to about 60°, or about 60° to about 90° (wherein about in this context refers only to +/−2°. In various embodiments, each fluid distribution outlet 595 may also comprise a different directional flow angle δ.

In various embodiments, multi-directional nozzle 500 may also comprise a pylon plug 575 inserted into first outlet 572 and configured to at least partially prevent the flow of fire extinguishing. Pylon plug 575 may allow a single orifice nozzle to be retrofit for use as a multi-directional nozzle 500. In various embodiments, pylon plug 575 may comprise the same attributes as plug 392, with brief reference to FIG. 3A. In that regard, pylon plug 575 may comprise any suitable material, shape, and/or size capable of at least partially preventing delivery of the fire extinguishing agent through first outlet 572 of pylon fitting 570.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multi-directional fire extinguishing nozzle, comprising:
   a pylon fitting having a first inlet and a first outlet;
   a hose fitting having a first end and a nozzle end, wherein the first end is coupled to the first outlet of the pylon fitting by a coupling nut; and
   a plurality of fluid distribution outlets each defining a void on an outer radial surface of the coupling nut and extending into the hose fitting between the first end and the nozzle end.

2. The multi-directional fire extinguishing nozzle of claim 1, wherein the fluid distribution outlets are oriented at an angle of about 5° to about 90° relative to an outer surface of the pylon fitting.

3. The multi-directional fire extinguishing nozzle of claim 1, further comprising a plug coupled to the nozzle end of the hose fitting.

4. The multi-directional fire extinguishing nozzle of claim 3, wherein the plug comprises a plug distribution outlet defining a void on an outer surface of the plug.

5. The multi-directional fire extinguishing nozzle of claim 1, wherein an outer surface of the hose fitting and an inner surface of the coupling nut define an annulus, and wherein the annulus is in fluid communication with the fluid distribution outlets.

6. The multi-directional fire extinguishing nozzle of claim 5, further comprising a plurality of inner outlets each defining a second void on the outer radial surface of the hose fitting between the first end and the nozzle end, wherein the inner outlets are in fluid communication with the annulus.

7. The multi-directional fire extinguishing nozzle of claim 1, wherein the multi-directional fire extinguishing nozzle is configured to deliver a fire extinguishing agent.

8. A nacelle for a gas turbine engine, comprising:
   a pylon structure configured to couple the nacelle to an aircraft;
   a core compartment enclosing an engine core of the gas turbine engine; and
   a multi-directional fire extinguishing nozzle coupled to a lower surface of the pylon structure and disposed in a radial direction towards the core compartment and the engine core of the gas turbine engine, the multi-directional fire extinguishing nozzle comprising:
      a pylon fitting having a first inlet and a first outlet;
      a hose fitting having a first end and a nozzle end, wherein the first end is coupled to the first outlet of the pylon fitting by a coupling nut; and
      a plurality of fluid distribution outlets each defining a void on an outer radial surface of the coupling nut and extending into the hose fitting between the first end and the nozzle end.

9. The nacelle for the gas turbine engine of claim 8, wherein the fluid distribution outlets are oriented at an angle of about 5° to about 90° relative to an outer surface of the pylon fitting.

10. The nacelle for the gas turbine engine of claim 8, further comprising a plug coupled to the nozzle end of the hose fitting.

11. The nacelle for the gas turbine engine of claim 10, wherein the plug comprises a plug distribution outlet defining a void on an outer surface of the plug.

12. The nacelle for the gas turbine engine of claim 8, wherein an outer surface of the hose fitting and an inner surface of the coupling nut define an annulus, and wherein the annulus is in fluid communication with the fluid distribution outlets.

13. The nacelle for the gas turbine engine of claim 12, further comprising a plurality of inner outlets each defining a second void on the outer radial surface of the hose fitting between the first end and the nozzle end, wherein the inner outlets are in fluid communication with the annulus.

14. The nacelle for the gas turbine engine of claim 8, wherein the multi-directional fire extinguishing nozzle is configured to deliver a fire extinguishing agent.

* * * * *